Feb. 19, 1924.  
C. W. GRAHAM  
1,483,969  
APPARATUS FOR CUTTING AND HANDLING CAN END LINERS  
Original Filed July 18, 1916   4 Sheets-Sheet 4
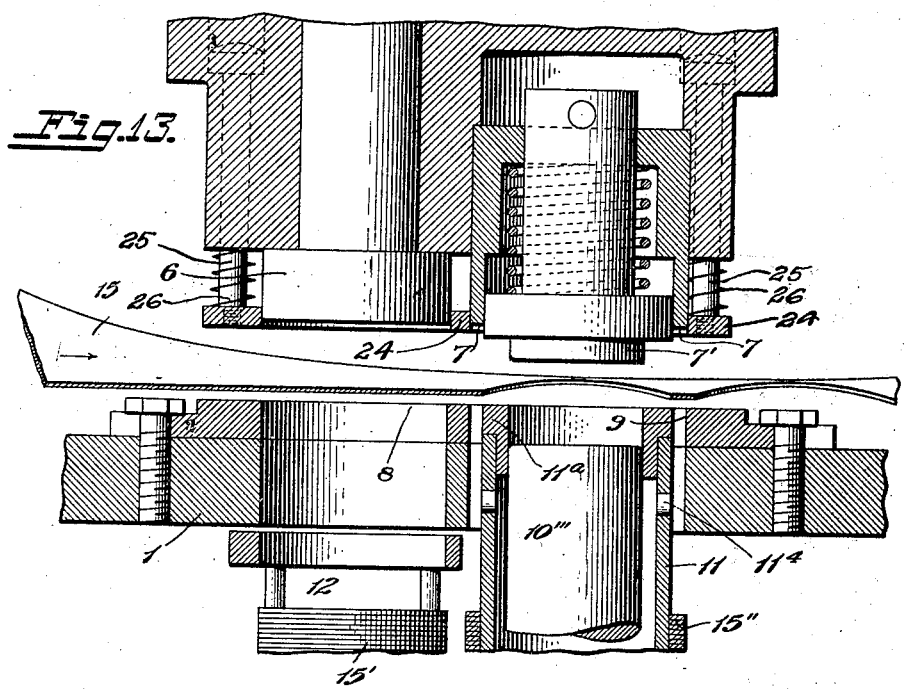
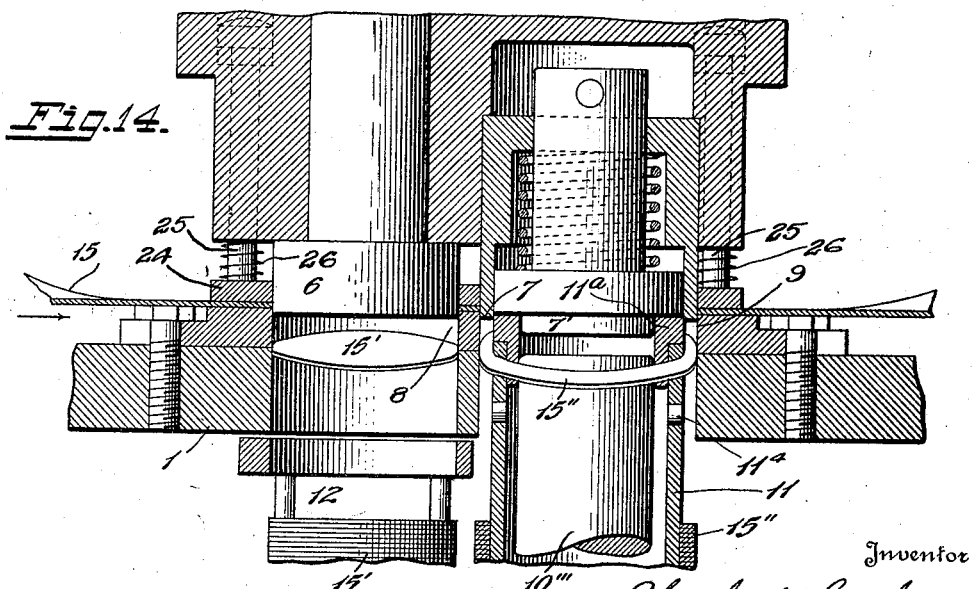
Inventor  
Charles W. Graham  
By H N Low  
Attorney Patented Feb. 19, 1924.

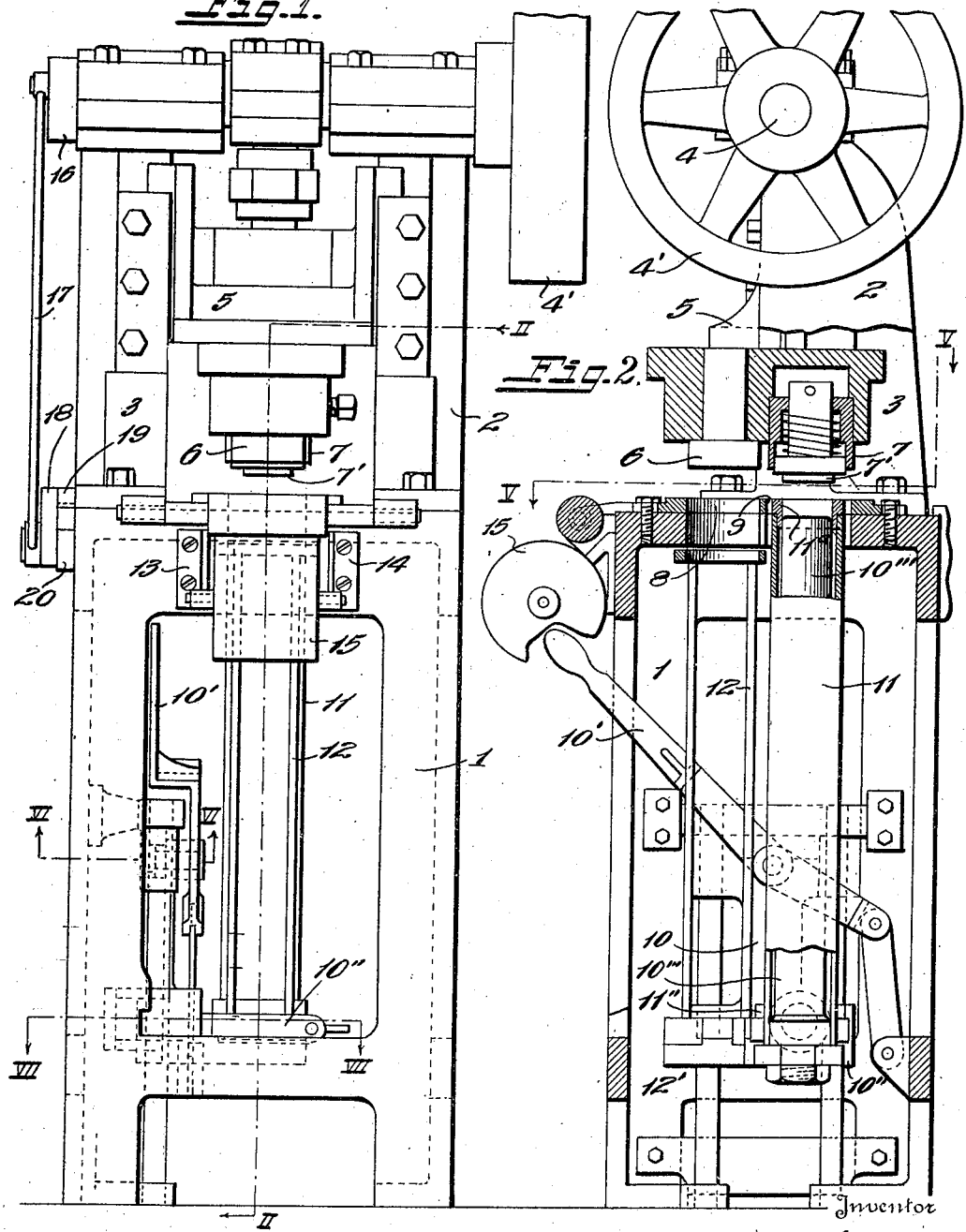

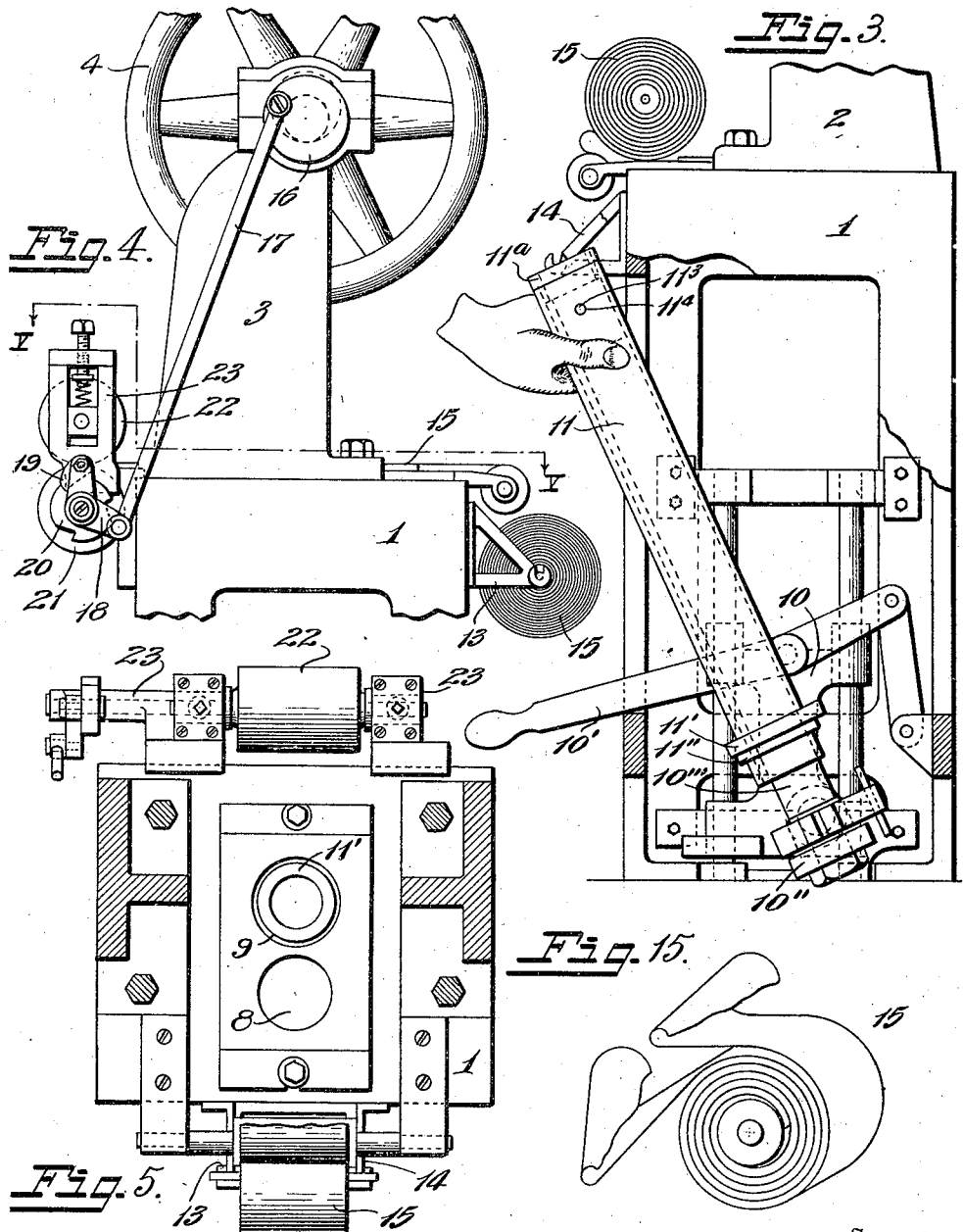

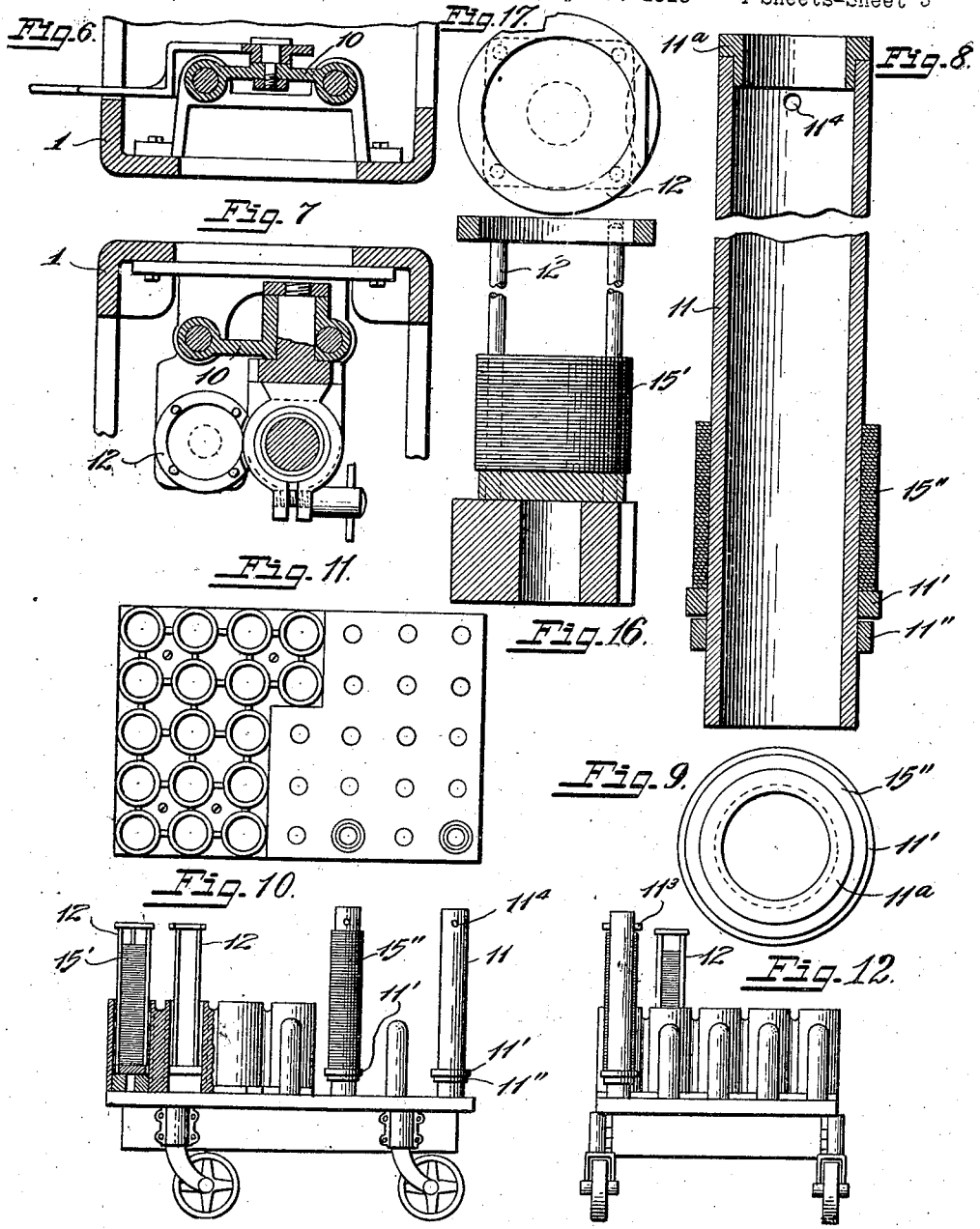

1,483,969

UNITED STATES PATENT OFFICE.

CHARLES W. GRAHAM, OF ALLENDALE, NEW JERSEY, ASSIGNOR TO AMERICAN CAN COMPANY, OF NEW YORK, N. Y., A CORPORATION OF NEW JERSEY.

APPARATUS FOR CUTTING AND HANDLING CAN-END LINERS.

Original application filed July 18, 1916, Serial No. 109,943. Patent No. 1,355,040, dated October 5, 1920. Divided and this application filed August 28, 1920. Serial No. 406,670.

*To all whom it may concern:*

Be it known that I, CHARLES W. GRAHAM, a citizen of the United States, residing at Allendale, in the county of Bergen and State of New Jersey, have invented certain new and useful Improvements in Apparatus for Cutting and Handling Can-End Liners, of which the following is a specification.

The invention relates to cutting and handling can end liners in bulk, previous to applying them to can ends; and handling gasket material in the shape of core discs, cut from the centers of the liners, and consists in the parts and combinations thereof hereinafter set forth and claimed.

With such objects in view, as well as other advantages which may be incident to the use of the improvements, the invention consists in the parts and combinations thereof hereinafter set forth and claimed, with the understanding that the several necessary elements constituting the same may be varied in proportions and arrangement without departing from the nature and scope of the invention.

In order to make the invention more clearly understood there are shown in the accompanying drawings means for carrying the same into practical effect, without limiting the improvements, in their useful applications, to the particular constructions, which, for the purpose of explanation, have been made the subject of illustration. In the said drawings:—

Fig. 1 is a front elevation of a liner cutting and stack assembling press.

Fig. 2 is a vertical section on line II—II of Fig. 1, showing a stack core in position underneath the liner die and a stack chute for the core pieces cut from the web previous to cutting the liner; in place under the core die.

Fig. 3 is a vertical sectional elevation on the same line as Fig. 2 showing the base of the machine and showing the liner stack core tipped out for removal or replacement. The roll of gasket material has been lifted up and laid on the bed of the machine to permit easy removal of the liner stack.

Fig. 4 is a side elevation of the top part of the machine showing the mechanism for feeding the paper web through the machine as the cores and liners are cut.

Fig. 5 is a plan section on line V—V of Fig. 2 showing the core and liner dies in their working positions.

Fig. 6 is a plan section on line VI—VI of Fig. 1, showing a detail of the carriage mechanism for raising and lowering the liner stack core and core chute into and out of position relative to the dies.

Fig. 7 is a similar plan section taken on line VII—VII of Fig. 1 showing a detail of the lower part of the carriage mechanism.

Fig. 8 is a detail sectional elevation of a liner stack core showing its construction and showing a quantity of liners placed thereon.

Fig. 9 is a plan of Fig. 8.

Fig. 10 is a side elevation of a transporting truck for conveying stack units to operating machines or to storage.

Figs. 11 and 12 are respectively a plan view and end elevation of the transporting truck.

Fig. 13 is an enlarged sectional view of the die cutting mechanism showing clearer than the smaller views, the exact relation of the dies and stack containers and the strip of gasket material; the strip has just been fed forward and is in position for cutting a center disc out by the punch 6 and die 8, and a ring liner by the punch 7 and die 9. The stack core 11 is here shown positioned concentric with the die 9 so that the pilot 7' will enter its mouth and hold it central while the ring is cut and left deposited around the core 11.

Fig. 14 is a similar view showing the cutting punches 6 and 7 in their lower positions, having cut a center disc and a ring liner and left them in their respective stack receptacles.

Fig. 15 shows the manner of rolling two strips of gasket material in superposed relation into a single roll, whereby they may be passed between the cutting dies in superposed position and two core discs and ring liners cut at one stroke of the cutting elements.

Fig. 16 is a side view partly in section, and broken away, of the holder or chute for the cut core disks.

Fig. 17 is a plan view of the same.

I have referred particularly to cutting liners from paper or like material. Paper or such fibrous material is, however, only one of the many materials suitable for gaskets or liners for can ends. Rubber compositions have been used for many years. Such material as cellulose compounds, rendered somewhat flexible and yielding by admixture with softening agents, such for instance as acetic acid compounds of cellulose, similar to cellulose acetate in colloidal form, which may be produced by partial acitilization of the original cellulose material; also compositions of gelatine or other albuminous matter rendered pliable by a suitable softening agent such as glycerine, are entirely suitable for the purpose, as long as they will fold into the double seam without cracking or checking. Thin sheet metal of a soft and yielding nature, such for example as tin foil, is also suitable for lining can ends.

It is possible to impregnate cloth with suitable surfacing material so as to render it available for gaskets. I therefore wish to extend my means for handling can end liners in multiple, to the use of any material from which can end liners can be made.

Referring to the drawings:

A housing 1 carries bearing members 2 and 3; the members 2 and 3 are bolted on top of the housing 1 in spaced relation, with shaft bearings and cross head bearings arranged to carry a main driving crank shaft 4 and a crosshead 5. The crosshead 5 carries a core punch 6 and a liner or gasket punch 7. Mounted on the top of the bed 1 is a companion core die 8 and a liner or gasket die 9. Mounted in the base of the housing 1 is a manually operated crosshead 10 carrying supports for maintaining the liner or gasket stack cores 11 and the center disc chutes 12 in proper relation to the cutting dies 8 and 9; the crosshead 10 is manipulated with the hand lever 10'. A fly wheel 4' serves to transmit motion to the crosshead 5. A roll of paper or other suitable web gasket material 15 is mounted on brackets 13 and 14 and is intermittently moved between the cutting dies by suitable feed mechanism comprising a crank disc 16 on the end of shaft 4, a rod 17 connecting with a rocker arm 18, pawl 19 and ratchet 20, and operating feed rolls 21 and 22 carried in suitable housings 23.

The tubular liner stack member 11 sits in a hinged socket 10", in the base of the crosshead 10 and is supported in a rigid vertical position by means of a supporting post 10''' which extends up inside the entire length of the member 11 and has a bearing in the steel collar 11ª in the top of the member 11; this post is rigid and tends to hold the upper end of the member 11 concentric with the pilot 7' carried by the punch 7. The combined supporting effect of the post 10''' and the pilot 7' will keep the upper end of the stack member 11 in perfect alignment with the ring or liner 15" as it is cut and placed on the stack member 11, and it is thereby held in a normally vertical position. This hinged socket member 10" is necessary to enable easy removal and replacement of the stack member 11, (see Fig. 3); the core chute 12 can be lifted vertically out of its supporting socket 12' and removed without a hinged base. The operation of the machine illustrating this means of cutting and handling can end liners would be as follows: With the hand lever 10' depressed as in Fig. 3, the crosshead 10 is placed in its lowermost position enabling the easy placement of a liner stack member 11 constituting a transfer core or mandrel. It is necessary to tilt the stack member 11 outward to be removed or placed in the machine, on account of the centering post 10''' extending through nearly its full length. Fig. 3 shows it just being passed down to position over the post 10''' by the hand of the operator. When it is fully seated it is moved to a vertical position; then the core disc chute 12 is placed in its position, when the hand lever is raised as in Fig. 2, carrying the crosshead 10 upward and placing the upper ends of the members 11 and 12 adjacent the dies 8 and 9, in position to receive the core discs 15' and liners 15" as they are cut from the web of liner material. After the stack carrying elements 11 and 12 are placed, the machine is started, the parts being so timed that at each reciprocation of the crosshead 5 the punches 6 and 7 simultaneously cut a core disc and a ring liner from the web and deposit each in their respective stack members. The core punch 6 itself removes the core downward out of the path of the web 15, and the liner is similarly removed by the punch 7. This last operation would leave the web embracing the latter punch but it is stripped off by the plate 24, which is yieldingly movable vertically with guiding rods 25 sliding in holes in the crosshead (Figs. 13 and 14). The plate is yieldingly pressed downward by springs 26. As the crosshead 5 recedes, the ratchet feed mechanism will advance the web of gasket or liner material equal to the center distance between the punches 6 and 7, thus placing the core opening, cut by punch 6, axially in alignment with punch 7, so that at the next down stroke of the crosshead 5, the punches 6 and 7 will cut a core disc and a ring liner and deposit each on the stack elements 11 and 12. This operation is repeated until the elements 11 and 12 are filled with liners and cores, when the machine is stopped by the operator, the stack units of liners and core pieces removed and empty stack containers replaced and the operation repeated. As the stack units are removed from the liner cutting machine they are preferably placed on suitably arranged transporting trucks (Figs. 10 to 12) where they can be temporarily stored or immediately conveyed to lining machines. In the storage and handling of can end liners by this means, mounted on portable stack cores, all liability to injury of the liners by reason of their delicacy of structure, flexibility and frangibility is obviated. By being assembled in superposed stack formation, a stack unit presents an object that can be almost roughly handled; they can be stood on end, or piled up in horizontal position one on top of the other without damage or mutilation to the thin ring liners, and when presented to the lining machines the stack units are inserted intact into the liner feed mechanism, so that single liners can be successively removed and deposited on can ends. The upper ends of the stack members or cores 11, form the lower ends of the stacks when they are inserted into the liner feed mechanism of the can end lining machines, and will operate in a manner to permit only one liner to be stripped therefrom at a time.

In first starting a cut in the web of gasket material it will be necessary to only extend the web through to the core punch so that a core opening is presented to the ring liner die at its first cut, otherwise the web would be somewhat mutilated by the pilot 7′ coming in contact therewith; in order to have the paper feed automatically during this first cutting a pair of narrow tapes could be pasted to the end of the paper that would span the die opening and yet draw the paper to the feed rolls. After the paper is once started and a roll is just finished, before the last end is allowed to pass out of the zone of the punches it is pasted to the end of the new roll so that there is always a web under the punches.

The manner of placing the stack unit into a lining machine and applying them to a can end, and means for such purpose, are set forth in my companion divisional application Serial No. 406,672, filed Aug. 28, 1920, now Patent 1,448,840, March 20, 1923.

This application is a division of my application Serial No. 109,943, filed July 18, 1916, now Patent No. 1,355,040, granted Oct. 5, 1920.

What is claimed is—

1. In a machine for cutting and handling ring liners, the combination of means for feeding a continuous web of liner material, a reciprocable punching head arranged to operate near the path of said web, a core punch fixed in said head, an annular liner punch fixed in said head and arranged to cut a liner while said core punch is cutting a core, web-stripping means for said punches, die elements arranged at the other side of the web and cooperating with said punches, a liner stack holder arranged to receive the cut liners, and a pilot carried by said head and adapted to engage with the end of the liner stack holder.

2. In a machine for cutting and handling ring liners, the combination of means for feeding a continuous web of liner material, a reciprocable punching head arranged to operate near the path of said web, a core punch fixed in said head, an annular liner punch fixed in said head and arranged to cut a liner while said core punch is cutting a core, web-stripping means for said punches, die elements arranged at the other side of the web and cooperating with said punches, a liner stack holder arranged to receive the cut liners, and a yielding pilot carried by said head and within said liner punch and adapted to engage within the end of the liner stack holder.

3. In a machine for cutting and handling ring liners, the combination of means for feeding a continuous web of liner material, a reciprocable punching head arranged to operate near the path of said web, a core punch fixed in said head, an annular liner punch fixed in said head and arranged to cut a liner while said core punch is cutting a core, web-stripping means for said punches, die elements arranged at the other side of the web and cooperating with said punches, a liner stack holder arranged to receive the cut liners, and a pilot carried by said head and adapted to engage with the end of the liner stack holder, said pilot engaging within the liner stack holder and said annular punch engaging exteriorly of said stack holder.

4. In a machine for cutting and handling ring liners, the combination of means for feeding a continuous web of liner material, a reciprocable punching head arranged to operate near the path of said web, a core punch fixed in said head, an annular liner punch fixed in said head and arranged to cut a liner while said core punch is cutting a core, web-stripping means for said punches, die elements arranged at the other side of the web and cooperating with said punches, a liner stack holder arranged to receive the cut liners, and a vertically movable support separably carrying the lower end of said liner stack holder.

5. In a machine for cutting and handling ring liners, the combination of means for feeding a continuous web of liner material, a reciprocable punching head arranged to operate near the path of said web, a core punch fixed in said head, an annular liner punch fixed in said head and arranged to cut a liner while said core punch is cutting a core, web-stripping means for said punches, die elements arranged at the other side of the web and cooperating with said punches, a liner stack holder arranged to receive the cut liners, and an oscillatable support separably carrying the lower end of said liner stack holder.

6. In a machine for cutting and handling ring liners, the combination of means for feeding a continuous web of liner material, a reciprocable punching head arranged to operate near the path of said web, a core punch fixed in said head, an annular liner punch fixed in said head and arranged to cut a liner while said core punch is cutting a core, a yielding web-stripping plate encircling both of said punches, die elements arranged at the other side of the web and cooperating with said punches, and a liner stack holder arranged to receive the cut liners.

7. In a machine for cutting and handling ring liners, the combination of means for feeding a continuous web of liner material, a reciprocable punching head arranged to operate near the path of said web, a core punch fixed in said head, an annular liner punch fixed in said head and arranged to cut a liner while said core punch is cutting a core, web-stripping means for said punches, die elements arranged at the other side of the web and cooperating with said punches, a liner stack holder arranged to receive and engage within the cut liners, and a core stack holder arranged to receive and engage without the cores.

8. In an apparatus for cutting and handling ring liners, the combination of means for cutting and stacking the same; a frame adapted to receive and support successively in line with the cutting devices a plurality of removable stack holders; and said stack holders having means for engagement with a stack holder receiving and transporting device having means for engaging and supporting said stack holders with liners stacked on said holders.

9. In an apparatus for cutting and handling ring liners, the combination of means for cutting and stacking the same; a frame adapted to receive and support successively in line with the cutting devices a plurality of removable stack holders; and a plurality of said stack holders having movable weights thereon at their bottom ends, and adapted to be successively adjusted to and fit said apparatus to receive the cut paper elements from the cutting devices, and adapted to be inverted and applied to the receiving and supporting means of a transporting device with the cut liners stacked thereon, said weights being at the bottoms of the holders when in said apparatus and being at the tops of said holders when on said transporting device.

10. In an apparatus for cutting and handling ring liners to be assembled with can ends, core and ring liner cutting dies, in combination with removable and invertible liner stack holders and core stack holders adapted to fit respectively their receiving and supporting means of the cutting apparatus in cooperation with the liner cutting and core cutting devices thereof.

11. In an apparatus for cutting and handling ring liners to be assembled with can ends, core cutting and ring liner cutting dies, means for receiving and supporting a holder for stacks of cores and a holder for stacks of ring liners in line with said cutting dies respectively, and a core stack holder and a ring liner stack holder adapted to fit respectively and removably their receiving and supporting means of the cutting apparatus in cooperation with the liner cutting and core cutting devices thereof, said liner stack holders being invertible as described and having movable weights thereon.

12. In a machine for cutting and handling ring liners, the combination of means for feeding liner material, means for cutting ring liners from said material, a liner stack holder arranged to receive the cut liners, and a vertically movable support separably carrying the lower end of said liner stack holder, said stack holder being tubular and removably fitted on said support.

13. In a machine for cutting and handling ring liners, the combination of means for feeding liner material, means for cutting ring liners from said material, a liner stack holder arranged to receive the cut liners, and an oscillatable support separably carrying the lower end of said liner stack holder.

14. In a machine for cutting and handling ring liners, the combination of means for feeding liner material, means for cutting ring liners from said material, a stack holder arranged to receive the cut liners, and means for adjusting said stack holder vertically relative to the cutting means, said stack holder being provided with a pivotal support on which it may be swung laterally when it is in a lower adjusted position.

15. In a machine for cutting and handling ring liners, the combination of means for feeding liner material, means for cutting ring liners from said material, a stack holder arranged to receive the cut liners, and movable holding means at the receiving end of the stack holder which engage with and disengage from said stack holder at and after the cutting action.

16. In a machine for cutting and handling ring liners, the combination of means for feeding liner material, means for cutting ring liners from said material, a stack holder arranged to receive the cut liners, said cutting means including a die element carried by the stack holder, and means for adjusting the stack holder relative to the cutting means, and centering means for the upper end of the stack holder acting in advance of the cutting dies.

In testimony whereof I affix my signature.

CHARLES W. GRAHAM.